United States Patent
Matsuo

(10) Patent No.: US 12,298,899 B2
(45) Date of Patent: May 13, 2025

(54) MEMORY SYSTEM AND ADDRESS VERIFICATION METHOD

(71) Applicant: Kioxia Corporation, Tokyo (JP)

(72) Inventor: Akira Matsuo, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 14 days.

(21) Appl. No.: 18/326,093

(22) Filed: May 31, 2023

(65) Prior Publication Data

US 2023/0393974 A1    Dec. 7, 2023

(30) Foreign Application Priority Data

Jun. 1, 2022   (JP) ................................ 2022-089719

(51) Int. Cl.
*G06F 12/00*    (2006.01)
*G06F 12/02*    (2006.01)

(52) U.S. Cl.
CPC ...... *G06F 12/0246* (2013.01); *G06F 12/0292* (2013.01); *G06F 2212/1008* (2013.01); *G06F 2212/2022* (2013.01)

(58) Field of Classification Search
None
See application file for complete search history.

(56) References Cited

U.S. PATENT DOCUMENTS

| 8,171,208 B2 | 5/2012 | Yano et al. |
| 9,378,135 B2 | 6/2016 | Bennett |
| 2013/0191580 A1 | 7/2013 | Lasser |
| 2021/0004167 A1* | 1/2021 | Lee ............. G06F 3/0653 |
| 2021/0056000 A1* | 2/2021 | Rostagni ........ G06F 11/0793 |

FOREIGN PATENT DOCUMENTS

| JP | 2009-211234 A | 9/2009 |
| JP | 2016-506585 A | 3/2016 |

* cited by examiner

*Primary Examiner* — Daniel D Tsui
(74) *Attorney, Agent, or Firm* — Oblon, McClelland, Maier & Neustadt, L.L.P.

(57) ABSTRACT

According to one embodiment, a memory system includes a nonvolatile memory and a controller. The controller is capable of communicating with a host and controls the nonvolatile memory. The controller determines validity of first information for a logical address, when the controller receives, from the host, a read command including the logical address and the first information, the logical address indicating a logical location on the nonvolatile memory, the first information being associated with the logical address.

9 Claims, 10 Drawing Sheets

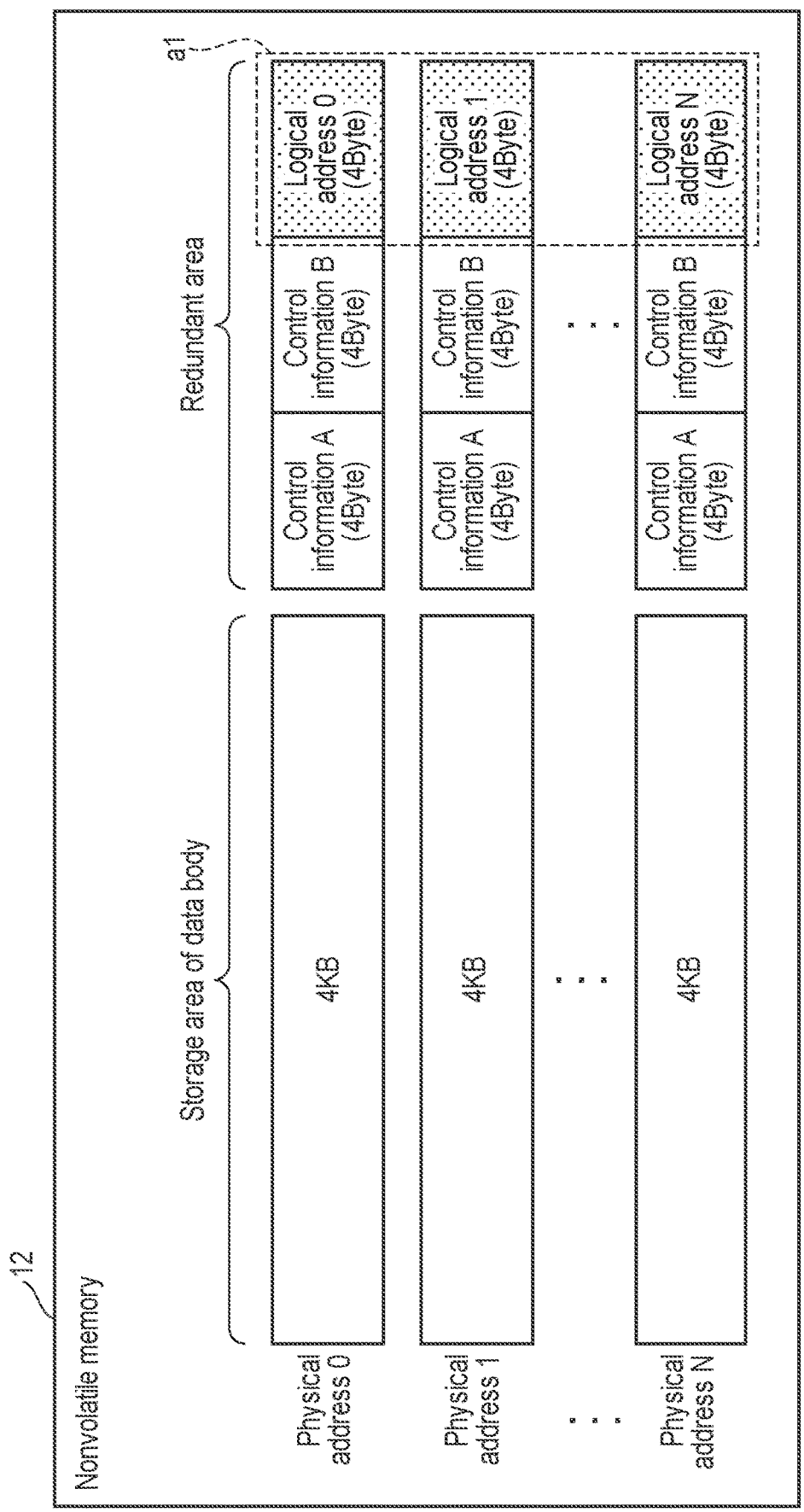
F I G. 2

| Logical address (A) | Logical address 0 | |
|---|---|---|
| Size (B) | 1 | |
| Address information (C) | 1 | Physical address 0 |

(A)

| Logical address (A) | Logical address 1 | |
|---|---|---|
| Size (B) | 1 | |
| Address information (C) | 0 | Logical address 1 |

| Logical address (A) | Logical address 1 | |
|---|---|---|
| Size (B) | 1 | |
| Address information (C) | 0 | Logical address X |

(A)

| Logical address (A) | Logical address 1 | |
|---|---|---|
| Size (B) | 1 | |
| Address information (C) | 1 | Logical address Y |

(B)

F I G. 10

MEMORY SYSTEM AND ADDRESS VERIFICATION METHOD

CROSS-REFERENCE TO RELATED APPLICATIONS

This application is based upon and claims the benefit of priority from Japanese Patent Application No. 2022-089719, filed Jun. 1, 2022, the entire contents of which are incorporated herein by reference.

FIELD

Embodiments described herein relate generally to a memory system and an address verification method.

BACKGROUND

In recent years, memory systems comprising nonvolatile memories such as a universal flash storage (UFS) device comprising a NAND flash memory (NAND memory) and a solid state drive (SSD) have been widely used. In this type of memory system, a controller which controls a nonvolatile memory associates a physical address indicating a physical location on the nonvolatile memory with a logical address used by a host and indicating a logical location on the nonvolatile memory, and reads and writes data relative to the nonvolatile memory based on a request from the host.

The memory system manages an address translation table which holds the correspondence relationship between logical addresses and physical addresses, and translates the logical address specified by the host into a physical address with reference to the address translation table as needed. The translation from a logical address into a physical address or from a physical address into a logical address is called address resolution, etc.

The data amount of the address translation table has become enormous in connection with the increase in the capacity of the nonvolatile memory. When the data amount of the address translation table is enormous, the read performance of the memory system may be degraded. In this respect, specifications which can remove the load of address resolution from the memory system as the host holds part of the address translation table and performs address resolution are established (for example, JESD220-3 "universal flash storage [UFS] host performance booster [HPB] extension").

For example, when a host corresponding to this specification issues a read command, the host adds a logical address and a physical address associated with the logical address to the read command (strictly speaking, the physical address is not limited to the physical address itself, and information which can specify the physical address in the memory system may be used). The controller of the memory system performs data read from a nonvolatile memory by using the physical address received from the host.

BRIEF DESCRIPTION OF THE DRAWINGS

FIG. 2 is a diagram showing an example of a storage of a logical address in the redundant area of a nonvolatile memory in the memory system according to the first embodiment.

FIG. 8 is a first diagram showing an example of a read command issued by the host in the memory system according to the second embodiment (in the case of address verification [coincidence]).

FIG. 10 is a second diagram showing an example of a read command issued by the host in the memory system according to the second embodiment (in the case of address verification [incoincidence]).

DETAILED DESCRIPTION

In general, according to one embodiment, a memory system includes a nonvolatile memory and a controller. The controller is capable of communicating with a host and controls the nonvolatile memory. The controller determines validity of first information for a logical address, when the controller receives, from the host, a read command including the logical address and the first information, the logical address indicating a logical location on the nonvolatile memory, the first information being associated with the logical address.

Embodiments will be described hereinafter with reference to the accompanying drawings.

First Embodiment

A first embodiment is explained.

Figure 1:
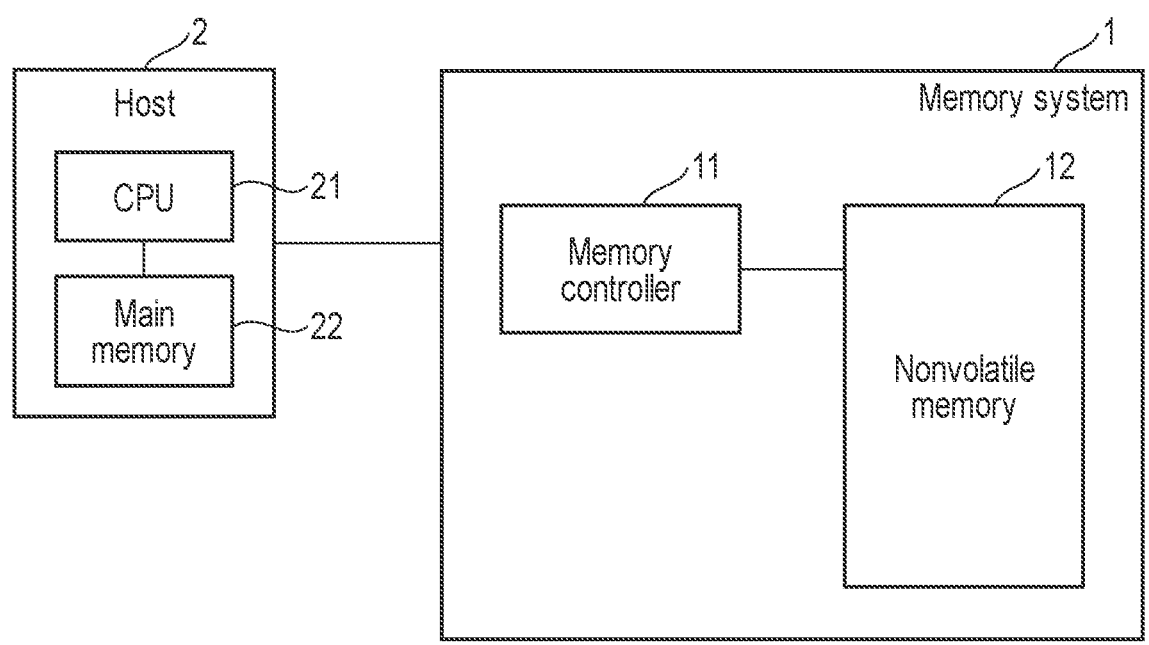
FIG. 1 is a diagram showing an example of a configuration of a memory system according to a first embodiment.

FIG. 1 is a diagram showing an example of a configuration of a memory system 1 according to a first embodiment. FIG. 1 also shows an example of connection between the memory system 1 and a host 2.

The memory system 1 comprises a memory controller 11 and a nonvolatile memory 12.

The memory controller 11 controls the nonvolatile memory 12. For example, the memory controller 11 performs data write to the nonvolatile memory 12 and data read from the nonvolatile memory 12 based on a command from the host 2. In some cases, the memory controller 11 autonomously performs data write to the nonvolatile memory 12 and data read from the nonvolatile memory 12 regardless of a command from the host 2 to, for example, optimize the nonvolatile memory 12.

The nonvolatile memory 12 is, for example, a NAND memory. Here, it is assumed that the memory system 1 is realized as a UFS device.

The host 2 is a mobile device which uses the memory system 1 as storage, such as a smartphone or a tablet terminal. The host 2 comprises a central processing unit (CPU) 21 and a main memory 22.

The CPU 21 loads various types of programs from the nonvolatile memory 12 of the memory system 1 into the main memory 22 of the host 2 and runs the programs. The programs include an operating system (OS) and application programs which operate under the control of the OS such as a utility program. The host 2 which runs these programs in the CPU 21 issues a read command and a write command to the memory system 1 based on the descriptions of the programs.

The main memory 22 is, for example, a dynamic random access memory (DRAM). Various types of programs and various types of data are stored in the main memory 22 as the work area of the CPU 21. The data includes information (hereinafter, referred to as address information) associated with a logical address indicating a logical location on the nonvolatile memory 12. The address information is information generated by the memory system 1 based on an address translation table which holds a correspondence relationship between a logical address and a physical address indicating a physical location on the nonvolatile memory 12. The address information includes a physical address.

It should be noted that a logical location on the nonvolatile memory 12 is a location provided by the memory system 1 to the host 2 in a logical address space. A concept corresponding to the logical address space is a physical address space. Therefore, a logical address can be considered as an address indicating a location in the logical address space, and a physical address can be considered as an address indicating a location in the physical address space.

The address information on the main memory 22 is obtained when the host 2 requests the address information from the memory system 1 as needed. When data is read from the memory system 1, the host 2 adds a logical address and address information associated with the logical address to a read command and issues the read command to the memory system 1. The memory controller 11 of the memory system 1 which receives this read command performs data read from the nonvolatile memory 12 by using a physical address included in the address information specified by the read command without performing address translation for translating a logical address into a physical address with reference to the address translation table.

Thus, both the memory system 1 of the first embodiment and the host 2 which uses the memory system 1 as storage correspond to a specification which enables the host 2 to perform address resolution in place of the memory system 1.

Here, it is assumed that the logical address which is specified by the host 2 when a read command or a write command is issued to the memory system 1 is a logical block address (LBA). The logical addresses are assigned to the logical address space in units of, for example, 4 KB. The address information is exchanged between the memory system 1 and the host 2 in units of, for example, the area of 16 MB. In other words, the host 2 can hold the address information of 4000 consecutive logical addresses in the main memory 22.

When the host 2 reads data from a logical address, the host 2 examines whether or not the address information associated with the logical address is held in the main memory 22. When the address information is held in the main memory 22, the host 2 adds the logical address and the address information to a read command and issues the read command to the memory system 1. The address information received from the memory system 1 is data which cannot be interpreted (in other words, data in which interpretation is unnecessary) for the host 2. When the host 2 issues the read command, the host 2 reads the address information associated with the target logical address from the main memory 22 and adds the address information to the read command. When the address information associated with the target logical address is not held in the main memory 22, the host 2 obtains address information related to the area of 16 MB including the logical address from the memory system 1.

When the host 2 reads data from a logical address, instead of the original address information associated with the logical address, the host 2 may add address information associated with another logical address to a read command because of a defect and issue the read command. In this case, the memory controller 11 of the memory system 1 reads different data from the nonvolatile memory 12 and transmits it to the host 2.

To solve this problem, the memory system 1 of the first embodiment comprises a mechanism which determines the validity of the address information received from the host 2. This mechanism is hereinafter described in detail.

FIG. 2 is a diagram showing an example of a storage logical address in the redundant area of the nonvolatile memory 12 in the memory system 1 according to the first embodiment.

Here, it is assumed that logical addresses are assigned to the logical address space in units of 4 KB. The units of 4 KB are derived from the use unit of the nonvolatile memory 12. In the data storage area of the nonvolatile memory 12, each section is $(4K+\alpha)$ bytes, and a physical address is assigned to each section. In other words, in addition to the storage area of the core data of 4 KB, a redundant area of a bytes is provided in each section. In the redundant area of the nonvolatile memory 12, a plurality of control information items related to the core data can be stored. The various types of information related to the core data are, for example, identification information indicating the type of the core data and an index for referring to internal management data.

When the memory controller 11 receives a write command to which a logical address is added from the host 2, the memory controller 11 selects one of the sections of the data storage area in an unused state, and stores the write data of the host in the storage area of the core data body of the selected section. At the same time, the memory controller 11 stores the logical address specified by the host 2 in the redundant area of the section. The redundant area has, for example, a capacity of the integral multiple of 4 bytes. The memory controller 11 compose each of various types of information including a logical address and related to the core data by 4 bytes and stores them in the redundant area. In FIG. 2, the hatched area shown by symbol a1 in the redundant area is the area in which a logical address is stored when data is written. For example, when the memory controller 11 receives a write command for storing write data 0 in logical address 0 from the host 2, the memory controller 11 stores write data 0 in the storage area to which physical address 0 is assigned. At this time, the memory controller 11 stores logical address 0 in a redundant area corresponding to the storage area to which physical address 0 is assigned.

When the memory controller 11 receives a read command to which a logical address and address information associated with the logical address are added from the host 2, the memory controller 11 performs data read from the nonvolatile memory 12 by using the address information. At this time, the memory controller 11 obtains read data from the storage area of the core data and obtains a logical address from the redundant area. The memory controller 11 compares the logical address specified by the host 2 with the logical address which is read from the nonvolatile memory 12 based on the address information specified by the host 2. When they are coincident with each other, the memory controller 11 determines that, for the logical address specified by the host 2, the address information which is also specified by the host 2 has validity. When they are not coincident with each other, the memory controller 11 determines that, for the logical address specified by the host 2, the address information which is also specified by the host 2 does not have validity.

Figure 3:
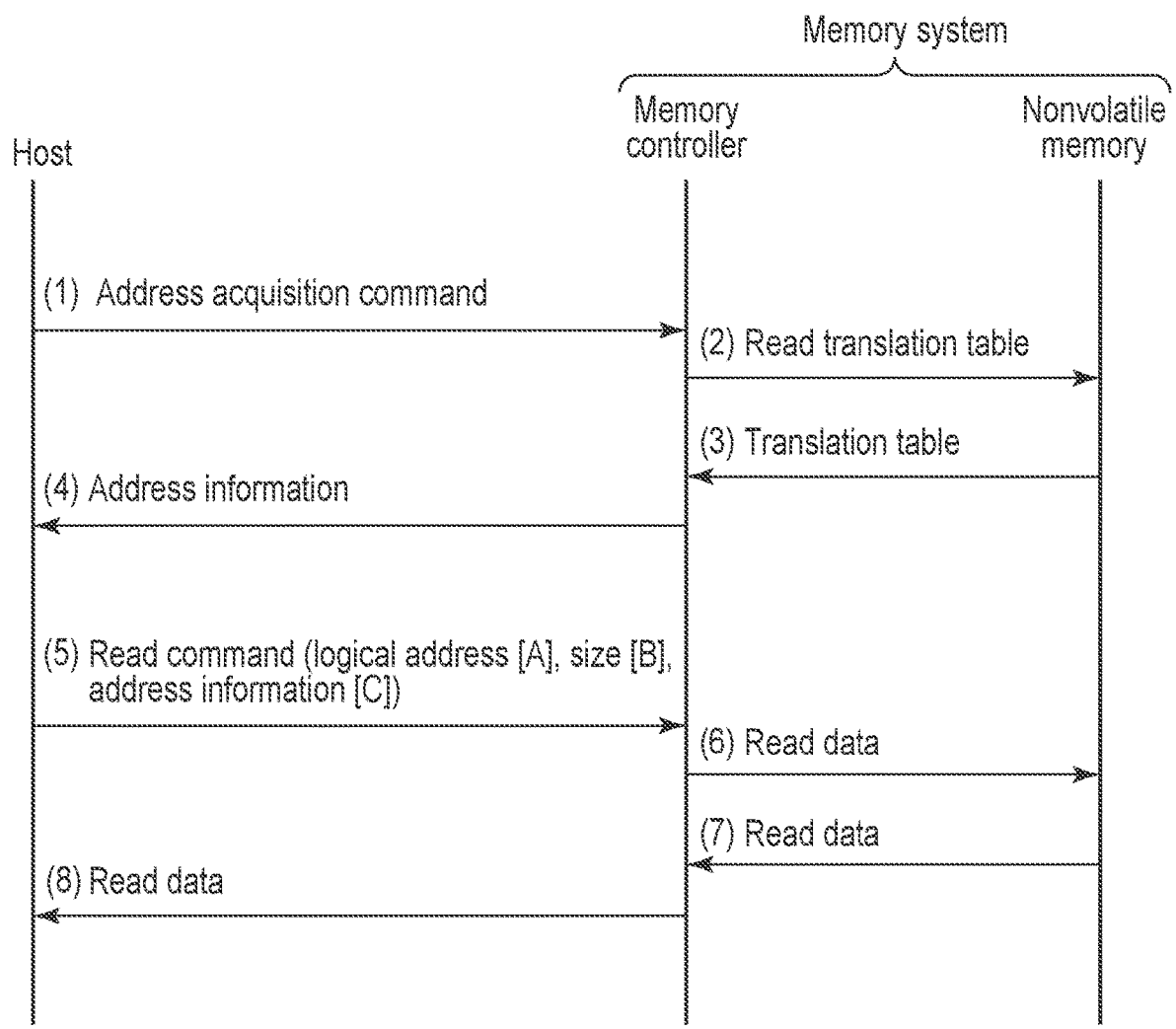
FIG. 3 is a sequence diagram showing the flow of operation when a read command is received from a host in a memory system according to a comparative example.

Here, first, this specification explains the flow of operation when a read command is received from a host in a memory system according to a comparative example with reference to FIG. 3.

First, a host issues an address acquisition command for obtaining address translation to a memory system (1). The memory controller of the memory system which receives this command instructs a nonvolatile memory to output part of an address translation table corresponding to the address information requested by the host (2). When the part of the address translation table is output from the nonvolatile memory (3), the memory controller generates address information based on the part of the address translation table and transmits it to the host (4).

Subsequently, the host issues a read command to which a logical address of read data (A), a size of the read data (B) and address information (C) are added to the memory system by using the address information received from the memory system (5). For example, when the size (B) is 1, it indicates 4 KB. When the size (B) is 2, it indicates 8 KB (4 KB×2).

The memory controller of the memory system which receives this command instructs the nonvolatile memory to output the data requested by the host by using the specified address information (C) (6). When the data is output from the nonvolatile memory based on the instruction (7), the memory controller transmits the data to the host 2 as read data (8).

In the memory system of the comparative example, even if the address information specified by the host is incorrect, the data read from the nonvolatile memory based on the incorrect address information is transmitted to the host.

Figure 4:
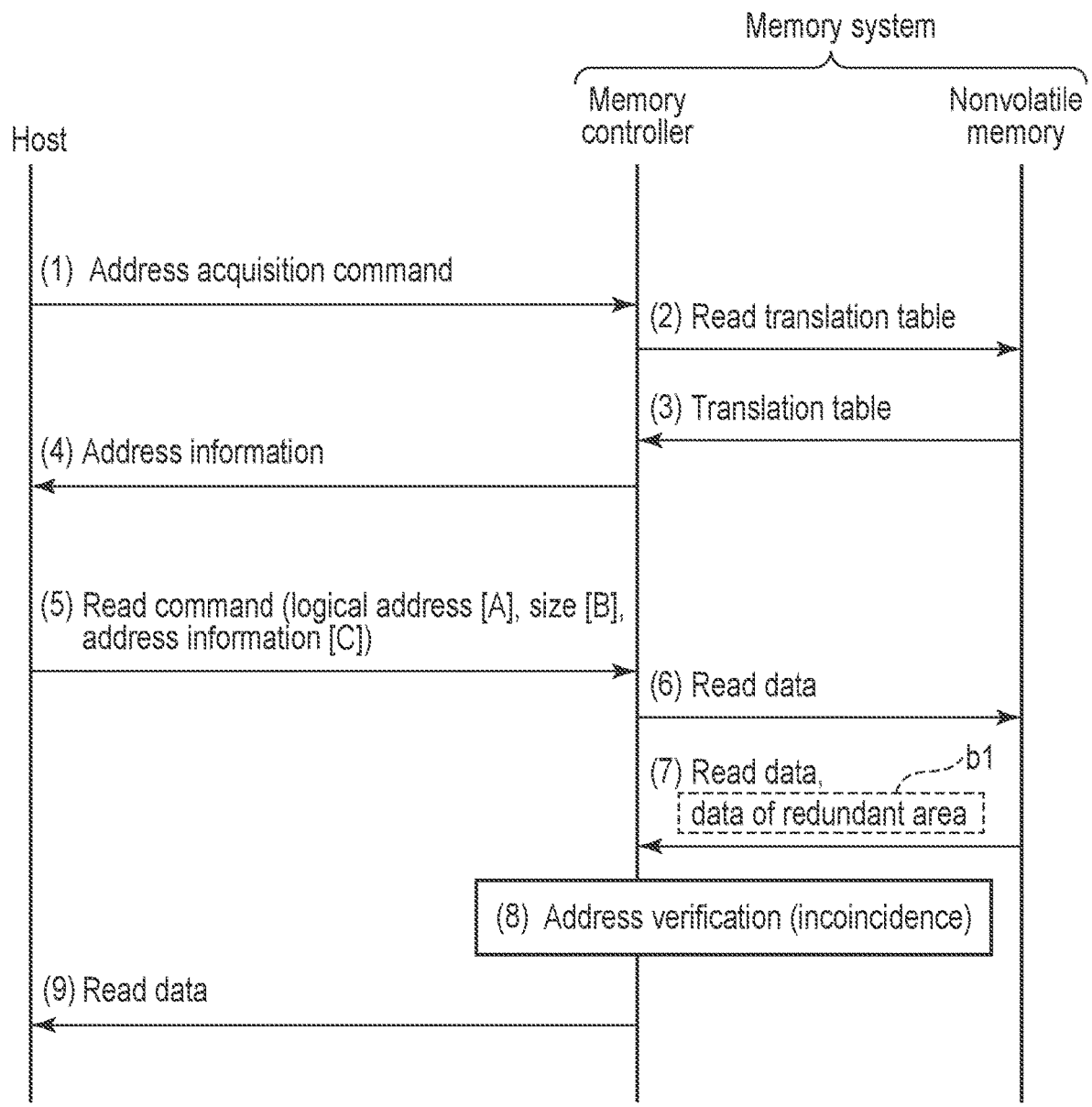
FIG. 4 is a first sequence diagram showing the flow of operation when a read command is received from a host in the memory system according to the first embodiment (in the case of address verification [coincidence]).

Now, this specification explains the flow of the operation which is performed when the memory system 1 of the first embodiment receives a read command from the host 2 with reference to FIG. 4. FIG. 4 includes the flow of the operation of the memory system 1 when the result of address verification shows that addresses are coincident with each other. The case where the result of address verification shows that addresses are coincident with each other refers to the case where the host 2 correctly reads address information associated with the target logical address from the main memory 22 and adds the address information to a read command.

First, the host 2 issues an address acquisition command for obtaining address information to the memory system (1). The memory controller 11 of the memory system 1 which receives this command instructs the nonvolatile memory 12 to output part of an address translation table corresponding to the address information requested by the host 2 (2). When the part of the address translation table is output from the nonvolatile memory 12 (3), the memory controller 11 generates address information based on the part of the address translation table and transmits it to the host 2 (4).

Subsequently, the host 2 issues a read command to which a logical address of read data (A), a size of the read data (B) and address information (C) are added to the memory system 1 by using the address information received from the memory system 1 (5). The flow is the same so far as the memory system of the comparative example explained above.

The memory controller 11 of the memory system 1 which receives this command instructs the nonvolatile memory 12 to output the data requested by the host 2 by using the physical address included in the specified address information (C) (6). At this time, the memory controller 11 also instructs the output of the data (logical address) stored in the redundant area.

When the data is output from the nonvolatile memory 12 based on the instruction (7), the memory controller 11 performs address verification by comparing the logical address specified by the read command with the logical address read from the redundant area of the nonvolatile memory 12 (8). When the two logical addresses are coincident with each other, the memory controller 11 transmits the data (core data) output from the nonvolatile memory to the host 2 as read data (9).

Figure 5:
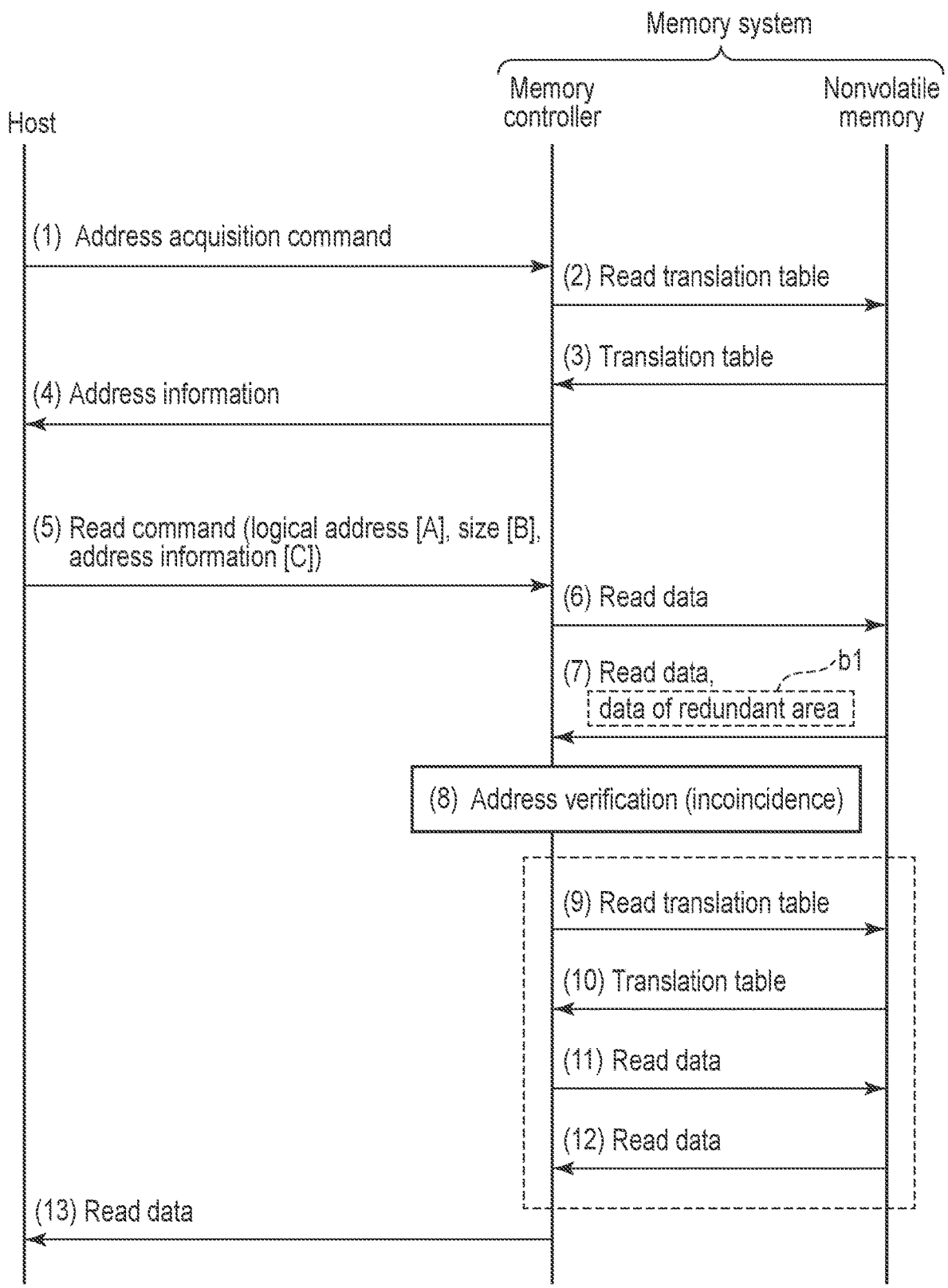
FIG. 5 is a second sequence diagram showing the flow of operation when a read command is received from the host in the memory system according to the first embodiment (in the case of address verification [incoincidence]).

Now, this specification explains the flow of operation when the result of address verification shows that addresses are not coincident with each other with reference to FIG. 5. The case where the result of address verification shows that addresses are not coincident with each other refers to, for example, the case where the host 2 reads address information associated with a logical address different from the target logical address from the main memory 22 and adds the read address information to a read command.

The flow is the same as FIG. 4 from (1) to (7), description thereof being omitted. The memory controller 11 performs address verification by comparing the logical address specified by the read command with the logical address read from the redundant area of the nonvolatile memory 12. When the two logical addresses are not coincident with each other as a result of the address verification of the memory controller 11 (8), the memory controller 11 instructs the nonvolatile memory 12 to output part of the address translation table including the logical address specified by the read command (9). When the part of the address translation table is output from the nonvolatile memory 12 (10), the memory controller 11 obtains the physical address associated with the logical address specified by the read command from the address translation table and in turn, instructs the nonvolatile memory 12 to output data by using the obtained physical address (11). The memory controller 11 transmits the data (core data) output from the nonvolatile memory to the host 2 as read data (12).

After the part of the address translation table is output (10), the memory controller 11 may further perform address verification by comparing the logical address specified by the read command with the logical address written to the redundant area of the data read in accordance with the physical address. When the two logical addresses are coincident with each other, the memory controller 11 instructs the nonvolatile memory 12 to output data by using the obtained physical address. When the two logical addresses are not coincident with each other, the memory controller 11 transmits an error response to the host 2.

As described above, in the memory system 1 of the first embodiment, as a logical address is stored in the redundant area of the nonvolatile memory 12, the validity of the address information specified by a read command for the logical address specified by the read command can be determined without degrading the read performance of the memory system 1.

Further, even if the address information specified by the host 2 is incorrect, correct data can be read from the nonvolatile memory 12 by using the original address information associated with the logical address specified by the host 2 and can be provided to the host 2.

Second Embodiment

Now, a second embodiment is explained.

In a manner similar to that of the memory system 1 of the first embodiment, it is assumed that the memory system 1 of the second embodiment is realized as a UFS device. The configuration of the memory system 1 of the second embodiment is the same as the memory system 1 of the first embodiment, overlapping description being omitted. The same structural elements as the first embodiment are denoted by the same reference numbers.

In the first embodiment, the memory controller 11 of the memory system 1 stores a logical address in the redundant area of the nonvolatile memory 12 when data is written. In the above explanation, when data is read, the memory controller 11 determines whether or not the address information added to a read command by the host 2 is correct by using this logical address.

In some cases, the host 2 issues a read command for reading data from an area in which data writing is not performed in the logical address space for, for example, the test of the memory system 1. Alternatively, such a read command may be issued when, for example, the host 2 performs sequential access for the consecutive areas in the logical address space including an area in which data is not written.

No logical address is stored in the redundant area in, of the sections of the data storage area of the nonvolatile memory 21, a section in which data is not stored in the storage area of the core data. Therefore, even if incorrect address information is added to a read command specifying a logical address in which data is not written, the information to be compared with the specified logical address is not present. Thus, the validity of the address information cannot be determined.

The memory system 1 of the second embodiment comprises a mechanism for determining the validity of the address information received from the host 2, even for a read command which specifies a logical address in which data is not written. This mechanism is explained in detail below.

As explained in the first embodiment, the address information which is generated based on the address translation table by the memory system 1 is data which cannot be interpreted (in other words, data in which interpretation is unnecessary) for the host 2. In other words, the address information which is generated based on the address translation table by the memory system 1 is data which can be arbitrarily generated in the memory system 1.

The memory controller 11 of the memory system 1 of the second embodiment determines, when the memory controller 11 receives a request for address information corresponding to a logical address from a host 2 and generates such address information, whether or not data is written to the target logical address based on an address translation table. Regarding a logical address in which data is written, the memory controller 11 generates address information including a written flag indicating that data is written, and the physical address associated with the logical address on the address translation table. Regarding a logical address in which data is not written, the memory controller 11 generates address information including identification information indicating that data is not written, and the logical address instead of a physical address.

Figure 6:
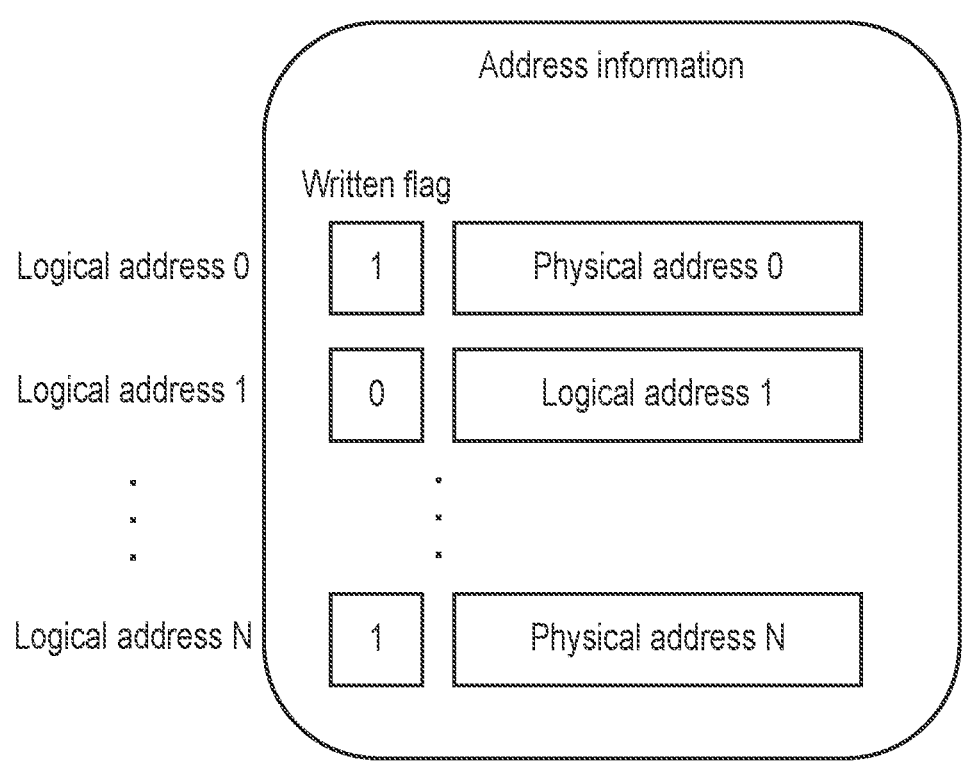
FIG. 6 is a diagram showing an example of the address information generated in a memory system according to a second embodiment.

FIG. 6 is a diagram showing an example of the address information generated by the memory controller 11 of the second embodiment.

In the example of FIG. 6, data is written in logical address 0 ("1"), and further, physical address is associated with logical address 0. No data is written in logical address 1 ("0"). As a result, instead of a physical address, logical address 1 is included in address information. It should be noted that, for example, when each of logical addresses and physical addresses consists of N bits, and only M (M<N) bits of the N bits are substantially used, the memory controller 11 may use part or all of (N−M) bits which are vacant bits as a written flag.

Figure 7:
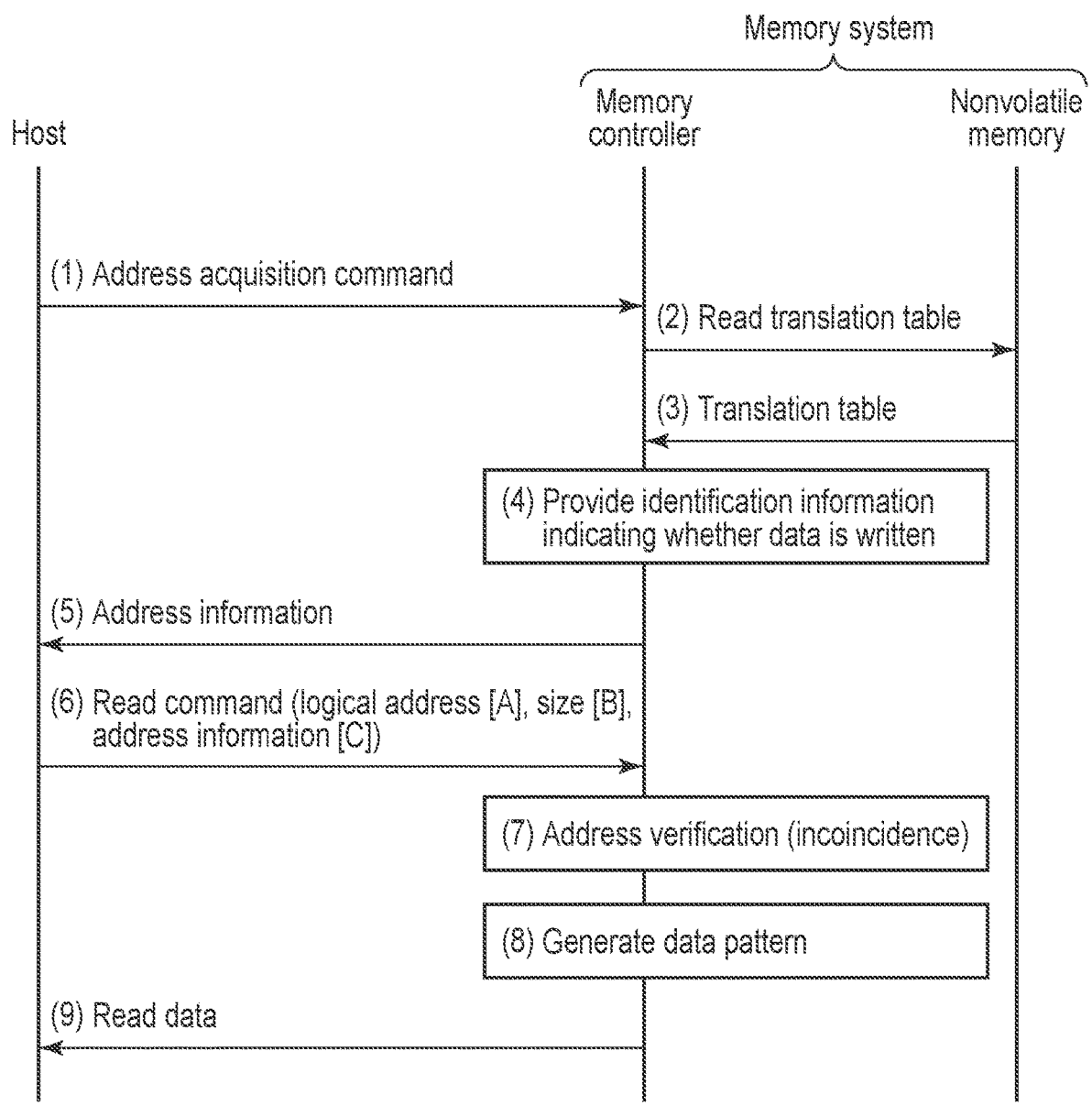
FIG. 7 is a first sequence diagram showing the flow of operation when a read command to which a logical address in which data is not written is added is received from a host in the memory system according to the second embodiment (in the case of address verification [coincidence]).

In consideration of the configuration of the address information shown in FIG. 6, now, this specification explains the flow of operation when a read command is received from the host 2 in the memory system 1 of the second embodiment with reference to FIG. 7. FIG. 7 includes the flow of the operation of the memory system 1 when a logical address in which data is not written is added to a read command, and the result of address verification shows that the addresses are coincident with each other.

First, the host 2 issues an address acquisition command for obtaining address information to the memory system (1). The memory controller 11 of the memory system 1 which receives this command instructs a nonvolatile memory 12 to output part of an address translation table corresponding to the address information requested by the host 2 (2). When the part of the address translation table is output from the nonvolatile memory 12 (3), the memory controller 11 generates address information based on the part of the address translation table. At this time, the memory controller 11 includes identification information indicating whether or not data is written in the address information (4). Regarding a logical address in which data is not written, the memory controller 11 includes, instead of a physical address, the logical address in the address information. Regarding a logical address in which data is written, as a matter of course, the memory controller 11 includes the associated physical address on the address translation table in the address information. The memory controller 11 transmits the address information generated in the above manner to the host 2 (5).

Subsequently, the host 2 issues a read command to which a logical address of read data (A), a size of the read data (B) and address information (C) are added to the memory system 1 by using the address information received from the memory system 1 (6). As described above, regarding the address information (C), the host 2 merely reads the data associated with the logical address of the read data (A) from the main memory 22 and adds it to the read command. FIG. 8 is a diagram showing an example of a read command issued by the host 2 in the second embodiment.

FIG. 8(A) shows an example of a read command for reading data from logical address 0 in which data is written. Address information (C) includes identification information indicating that data is written, and physical address 0 associated with logical address 0. FIG. 8(B) shows an example of a read command for reading data from logical address 1 in which data is not written. Address information (C)

includes identification information indicating that data is not written, and logical address 1 instead of a physical address.

The memory controller 11 of the memory system 1 which receives a read command from the host 2 firstly determines whether the identification information included in the address information indicates that data is written or data is not written. Here, it is assumed that the identification information indicates that data is not written like the command of FIG. 8(B).

Returning to FIG. 7, when the identification information indicates that data is not written, the memory controller 11 performs verification by comparing the logical address specified by the read command with the logical address included in the address information (7). When the two logical addresses are coincident with each other, the memory controller 11 determines that correct address information is specified, prepares data having a predetermined pattern as the data to be read from the logical address in which data is not written (8), and transmits the prepared data to the host 2 as read data (9). The data having a predetermined pattern is, for example, data in which all bits are 0.

It should be noted that, when a command in which identification information indicates that data is written like the command of FIG. 8(A) is received, as explained in the first embodiment, data is read from the nonvolatile memory 12 using the physical address included in the address information, and verification is performed by using the logical address stored in the redundant area.

Figure 9:
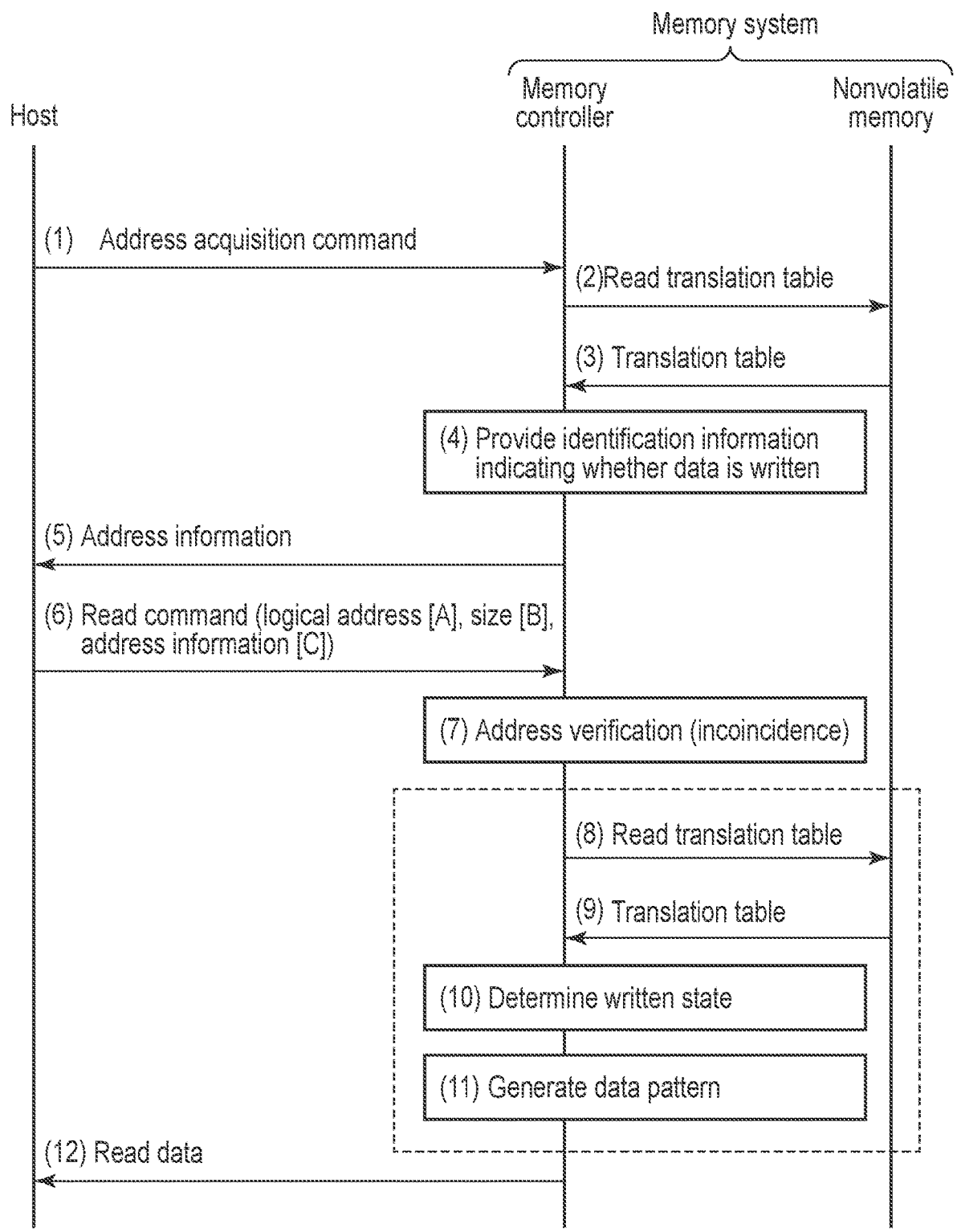
FIG. 9 is a first sequence diagram showing the flow of operation when a read command to which a logical address in which data is not written is added is received from the host in the memory system according to the second embodiment (in the case of address verification [incoincidence]).

Now, this specification explains the flow of operation when a logical address in which data is not written is specified, and further, the result of address verification shows that the addresses are not coincident with each other with reference to FIG. 9. FIG. 10(A) shows an example of a read command indicating that address verification shows that addresses are not coincident with each other. The read command shown in FIG. 10(A) specifies logical address 1 in which data is not written as logical address of the read data (A). However, the read command specifies the address information of logical address X in which data is not written instead of the address information of logical address 1.

The flow is the same as FIG. 7 from (1) to (6), description thereof being omitted. The memory controller 11 performs address verification by comparing the logical address specified by the read command with the logical address included in the address information. When the two logical addresses are not coincident with each other as a result of the address verification of the memory controller 11 (7), the nonvolatile memory 12 is instructed to output part of the address translation table including the logical address specified by the read command (8). When the data is output from the nonvolatile memory 12 based on the instruction (9), the memory controller 11 determines the original written state of the logical address specified by the read command (10). When the logical address specified by the read command is in an unwritten state, the memory controller 11 prepares the data having a predetermined pattern described above (11) and transmits the prepared data to the host 2 as read data (12).

In the example of FIG. 10(A), the address information of another logical address in which data is not written is incorrectly added to the read command. However, there is a possibility that the address information of another logical address in which data is written is incorrectly added. The read command shown in FIG. 10(B) specifies logical address 1 in which data is not written as logical address of the read data (A), and specifies address information (identification information 1, physical address Y) in which data is written instead of the address information of logical address 1. In this case, the memory controller 11 firstly reads data from the nonvolatile memory 12 by using the physical address included in the address information, and performs address verification by using the logical address stored in the redundant area in a manner similar to that of (6) to (12) of FIG. 5 of the first embodiment.

As explained above, the memory system 1 of the second embodiment can further determine the validity of the address information specified by a read command to which a logical address in which data is not written is added.

Moreover, even if the address information specified by the host 2 is incorrect, after the original address information associated with the logical address specified by the host 2 is confirmed, the data which has a predetermined pattern and should be read from the logical address in which data is not written can be provided to the host 2.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
  a nonvolatile memory; and
  a controller capable of communicating with a host and configured to control the nonvolatile memory,
  wherein the controller is configured to:
    generate a first information based on an address translation table holding a correspondence relationship between a logical address and a physical address, the logical address indicating a logical location on the nonvolatile memory, the physical address indicating a physical location on the nonvolatile memory based on a request from the host, the first information being associated with the logical address,
    transmit the first information to the host,
    when the controller receives a read command including the logical address and the first information from the host, determine validity of the first information for the logical address,
    regarding a logical address in which data is written and with which a physical address is associated, generate the first information including identification information indicating that data is written and the associated physical address,
    regarding a logical address in which data is not written and with which no physical address is associated, generate the first information including identification information indicating that data is not written and a logical address with which no physical address is associated, and
    when the identification information included in the first information in the read command indicates that data is not written, as the determination of the validity, compare the logical address included in the read command with the logical address included in the first information in the read command.

2. The memory system of claim 1, wherein:
  the first information includes a physical address indicating a physical location on the nonvolatile memory, and the controller is configured to
read data from the nonvolatile memory together with a logical address recorded in a redundant area provided in each section of an area of the nonvolatile memory to which the physical address included in the first information is assigned by using the physical address, and
compare the logical address included in the read command with the logical address recorded in the redundant area as the determination of the validity.

3. The memory system of claim 2, wherein the controller is configured to
transmit, when the logical address included in the read command is coincident with the logical address recorded in the redundant area, the data read from the nonvolatile memory to the host, and
when the logical address included in the read command is not coincident with the logical address recorded in the redundant area,
obtain a physical address corresponding to the logical address included in the read command with reference to an address translation table holding a correspondence relationship between the logical address and the physical address,
read data from the nonvolatile memory by using the obtained physical address, and
transmit the data read from the nonvolatile memory to the host.

4. The memory system of claim 1, wherein the controller is configured to
generate, when the logical address included in the read command is coincident with the logical address included in the first information in the read command, data having a predetermined pattern, and transmit the data to the host, and
when the logical address included in the read command is not coincident with the logical address included in the first information in the read command,
determine whether data is written in the logical address included in the read command with reference to the address translation table,
when data is written, and a physical address is associated with the logical address included in the read command on the address translation table, read data from the nonvolatile memory and transmit the read data to the host by using the associated physical address, and
when data is not written, and no physical address is associated with the logical address included in the read command on the address translation table, generate the data having the predetermined pattern and transmit the generated data to the host.

5. The memory system of claim 1, wherein when the identification information included in the first information in the read command indicates that data is written, the controller is configured to read data from the nonvolatile memory by using the physical address included in the first information and transmit the read data to the host.

6. The memory system of claim 5, wherein the controller is configured to
read data from the nonvolatile memory together with a logical address recorded in a redundant area provided in each section of an area of the nonvolatile memory to which the physical address included in the first information is assigned by using the physical address, and
compare the logical address included in the read command with the logical address recorded in the redundant area to determine the validity.

7. The memory system of claim 6, wherein the controller is configured to
transmit, when the logical address included in the read commands is coincident with the logical address recorded in the redundant area, the data read from the nonvolatile memory to the host, and
when the logical address included in the read command is not coincident with the logical address recorded in the redundant area,
obtain a physical address corresponding to the logical address included in the read command with reference to the address translation table holding the correspondence relationship between the logical address and the physical address,
read data from the nonvolatile memory by using the obtained physical address, and
transmit the data read from the nonvolatile memory to the host.

8. The memory system of claim 1, wherein the controller is configured to include the identification information in the first information by using a vacant bit common to the logical address and the physical address.

9. An address verification method of a controller which controls a nonvolatile memory, the method comprising:
generating a first information based on an address translation table holding a correspondence relationship between a logical address and a physical address, the logical address indicating a logical location on the nonvolatile memory, the physical address indicating a physical location on the nonvolatile memory based on a request from a host, the first information being associated with the logical address;
transmitting the first information to the host;
receiving a read command including a logical address and first information;
in response to receiving the read command, determining validity of the first information for the logical address;
regarding a logical address in which data is written and with which a physical address is associated, generating the first information including identification information indicating that data is written and the associated physical address;
regarding a logical address in which data is not written and with which no physical address is associated, generating the first information including identification information indicating that data is not written and a logical address with which no physical address is associated;
detecting that the identification information included in the first information in the read command indicates that data is not written; and
in response to detecting that the identification information included in the first information in the read command indicates that data is not written, as the determination of the validity, comparing the logical address included in the read command with the logical address included in the first information in the read command.

* * * * *